United States Patent [19]

Langenohl et al.

[11] Patent Number: 4,546,705

[45] Date of Patent: Oct. 15, 1985

[54] BLANK FOR A SABOT AND PROCESS FOR MAKING THE SAME

[75] Inventors: Rolf Langenohl, Viersen; Heinz Mestekemper, Ratingen, both of Fed. Rep. of Germany

[73] Assignee: Rheinmetall GmbH, Duesseldorf, Fed. Rep. of Germany

[21] Appl. No.: 463,836

[22] PCT Filed: Jun. 25, 1982

[86] PCT No.: PCT/DE82/00134
§ 371 Date: Feb. 4, 1983
§ 102(e) Date: Feb. 4, 1983

[87] PCT Pub. No.: WO83/00214
PCT Pub. Date: Jan. 20, 1983

[30] Foreign Application Priority Data
Jun. 26, 1981 [DE] Fed. Rep. of Germany ....... 3125129

[51] Int. Cl.$^4$ ............................................. F42B 13/16
[52] U.S. Cl. ..................................... 102/520; 29/1.2; 29/527.4; 72/256; 72/46; 428/577; 428/542.8
[58] Field of Search ................... 102/520–521; 72/46, 256; 29/1.2–1.23, 527.4; 428/542.8, 577

[56] References Cited

U.S. PATENT DOCUMENTS

| 2,183,502 | 6/1938 | Lefere . |
| 2,933,799 | 5/1957 | Semon . |
| 3,430,570 | 3/1969 | Barr . |
| 3,551,972 | 1/1971 | Engel . |
| 4,360,954 | 11/1982 | Burns et al. .......................... 102/521 |

FOREIGN PATENT DOCUMENTS

| 448142 | 5/1972 | Austria . |
| 22688 | 1/1981 | European Pat. Off. . |
| 693451 | 6/1940 | Fed. Rep. of Germany . |
| 1262830 | 3/1968 | Fed. Rep. of Germany ...... 102/520 |
| 324239 | 7/1902 | France . |

*Primary Examiner*—Harold J. Tudor

[57] ABSTRACT

A blank for a sabot having premachined separating lines which are fabricated for the purpose of avoiding cost-intensive machinery by means of extrusion presses and subsequently reduction rolling. A predetermined oversize relative to the finished sabot can be strictly adapted to prevailing requirements by means of a radial gap extending between the separating lines and the peripheral surface.

6 Claims, 5 Drawing Figures

BLANK FOR A SABOT AND PROCESS FOR MAKING THE SAME

BACKGROUND OF THE INVENTION

This invention relates to sabot blanks but more particularly to a rotation-symmetrical sabot blank preferably made of a metallic material.

It is known in the art that blanks for rotation-symmetrical sabots are finished as round bars, which after being cut to length, are shaped extensively by machining and are thereafter cut into segments by means of a saw cutter. This fabrication is disadvantageously complex and cost intensive.

SUMMARY OF THE INVENTION

It is an object of the present invention to provide a sabot blank that will allow sabot fabrication to be substantially simplified and made more inexpensive.

It is another object of the present invention to provide a sabot blank, preferably made of a metallic material, for a rotation-symmetrical sabot arranged around a sub-caliber projectile in a region between the nose and tail thereof and having at least two segments, which extend along radial separating lines over the entire sabot length, characterized by the blank having preformed radial separating lines.

It is another object of the present invention to provide a process for producing a sabot blank, preferably made of a metallic material, for a rotation-symmetrical sabot arranged around a sub-caliber projectile in a region between the nose and tail thereof and having at least two segments, which extend along radial separating lines over the entire sabot length, characterized by the blank having preformed radial separating lines and characterized by the following process: from a starting blank billet there is formed without the formation of shavings over the entire length of the blank billet a substantially circular cross-sectional shape, and radial cuts having substantially wedge-shaped cross-sections are introduced; the number of radial cuts corresponds to the number of separating lines of the sabot; the cross-sectional surface is further formed without the formation of shavings and the wedge-shaped cuts are thereby closed, whereby the mutually adjoining surface regions are not welded to each other; the semi-finished product is divided transversely to the longitudinal axis into predetermined lengths of a corresponding blank.

It is yet still another object of the present invention to provide a process for producing a sabot blank, preferably made of a metallic material, for a rotation-symmetrical sabot arranged around a sub-caliber projectile in a region between the nose and tail thereof and having at least two segments, which extend along radial separating lines over the entire sabot length, characterized by the blank having preformed radial separating lines whereby the semi-finished product of the first process step is produced by means of extrusion presses and the semi-finished product of the second process step is produced from the semi-finished product of the first process step by means of the reduction rollers.

It is yet still another object of the present invention to provide a process for producing a sabot blank, preferably made of a metallic material, for a rotation-symmetrical sabot arranged around a sub-caliber projectile in a region between the nose and tail thereof and having at least two segments which extend along radial separating lines of the entire sabot length, characterized by the blank having preformed radial separating lines whereby there is introduced a separating medium, for example, graphite, into the cut surfaces prior to the closing thereof.

Briefly, there is a blank for a sabot having premachined separating lines which are fabricated for the purpose of avoiding cost-intensive machining by means of extrusion presses and subsequent reduction rolling.

DETAILED DESCRIPTION OF THE PREFERRED EMBODIMENT

Figure 1:
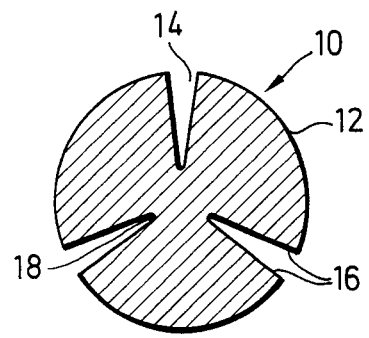
FIG. 1 is a cross-sectional view of the first semi-finished blank product of a first process step of the present invention.
Figure 2:
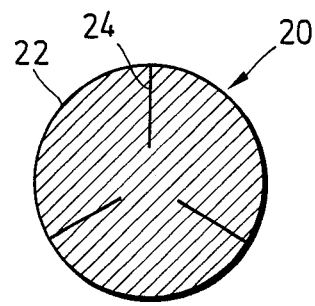
FIG. 2 is a cross-sectional view of a semi-finished blank product corresponding to the product of the first step of a second process step of the present invention.
Figure 5:
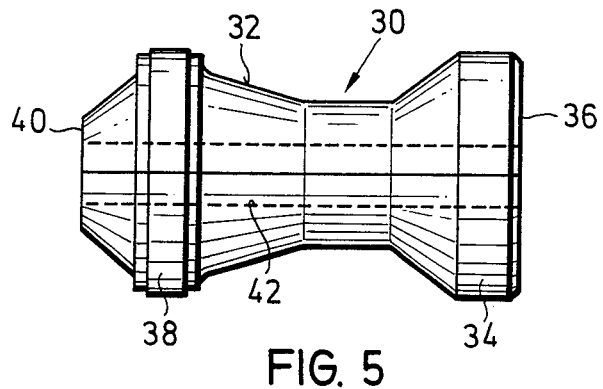
FIG. 5 is a lateral elevational view of a sabot illustrated at a comparatively large scale.

In FIG. 1 there is shown the cross-section of an extruded strand which represents the first semi-finished workpiece 10 of a first step having a peripheral surface 12 and three cuts 14 of substantially wedge-shaped cross-section, which are limited by cut surfaces 16. These cut surfaces 16 merge at a bottom 18 in the vicinity of the center of the strand. In order to attain a semi-finished product 20 in a second process step as shown in FIG. 2, the semi-finished product 10 is reduced in cross-section preferably by rolling, whereby the cuts 14 are closed to form separating lines 24, and a substantially closed peripheral surface 22 is formed. In order to avoid a mutual cold welding of the cut surfaces 16, the surfaces can be provided with separating means prior to the reduction rolling thereof. Graphite, for example, has been found suitable for this purpose. If the semi-finished product 20 is of large diameter for a corresponding blank, the cutting to length prior to the further processing for obtaining blanks can be of advantage. With small diameters, however, it can be advantageous to carry out the work for obtaining a contour 32 as shown in FIG. 5 prior to the cutting to length.

Figure 3:
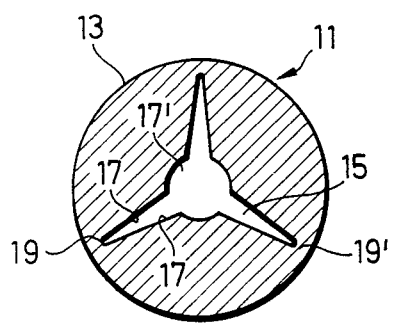
FIG. 3 is a cross-sectional view of a second semi-finished blank product of the first process step of the present invention.
Figure 4:
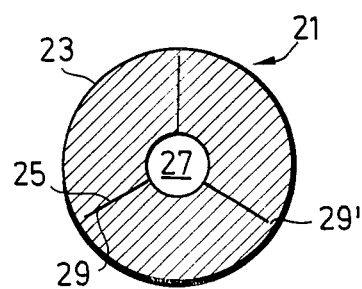
FIG. 4 is a cross-section illustrating the corresponding semi-finished product of the second process step of FIG. 3.

Referring now to FIG. 3, there is shown a cross-section of an extruded strand forming a second semi-finished product 11 of a first process step. Thereby cuts 15 extend from a central hollow space 17' along cut surfaces 17 up to a bottom 19, which is separated from the peripheral surface 13 only by a narrow gap 19'. By obtaining a semi-finished intermediate product 21 of a second process step as shown in FIG. 4, there results also a closing of the cuts 17 to form separating lines 25, the outer ends of which are separated by distance 29' from the intact peripheral surface 23. The further processing and working of the extruded strand is carried out in the same manner as has been described in connection with the embodiment of FIG. 2. However, thereby the advantages are rendered that, the introduction of central bore 42 as shown in FIG. 5 is considerably simplified and leads to a reduced machine volume. A further advantage consists in that for insertion of the bore

We claim:

1. An improved process for producing a blank for a rotation-symmetrical sabot arranged around a sub-caliber projectile in a region between the nose and tail thereof and having at least two segments, which extend along radial separating lines over the entire sabot length, wherein the improvement comprises the steps of:

(a) non-cuttingly shaping over the entire length of the blank a substantially circular cross-sectional shape, and introducing radial cuts having substantially wedge-shaped cross-sections, the number of radial cuts corresponds to the number of separating lines of the sabot, so that a semi-finished product in a first process step is formed;

(b) closing the wedge-shaped cuts, so that mutually adjacent surface regions of the cuts are in contact with one another at separating lines, and so that a semi-finished product of a second process step is obtained by means of which the semi-finished product is reduced to a predetermined excess dimension; and (c) dividing the semi-finished product transversely to the longitudinal axis into predetermined lengths of a blank, corresponding to the sabot.

2. An improved process for producing a blank for a rotation-symmetrical sabot arranged around a sub-caliber projectile in the region between the nose and tail thereof and having at least two segments, which extend along said preformed radial separating lines over the entire sabot length, as in claim 1, wherein the improvement further comprises that the semi-finished product of the first process step is produced by means of extrusion presses and the semi-finished product of the second process step is produced from the semi-finished product of the first process step by means of reduction rolling.

3. An improved process for producing a blank, preferably made of a metallic material, for a rotation-symmetrical sabot arranged around a sub-caliber projectile in a region between the nose and tail thereof and having at least two segments, which extend along said preformed radial separating lines over the entire sabot length, as in claim 1, wherein the improvement further comprises the introduction of a separating medium, onto the cut surfaces prior to the closing thereof.

4. An improved process for producing a blank made of a metallic material, for a rotation-symmetrical sabot arranged around a sub-caliber projectile in the region between the nose and tail thereof and having at least two segments, which extend along said preformed radial separating lines over the entire sabot length, as in claim 3, wherein the separating medium is graphite.

5. An improved blank for a rotation-symmetrical sabot which is produced in accordance with the process of claim 3, which sabot is arranged around a sub-caliber projectile in a region between the nose and tail thereof, and having at least two segments, which extend along radial separating lines over the entire sabot length, wherein the improvement comprises that the blank has preformed radial separating lines.

6. An improved blank for a rotation-symmetrical sabot arranged around a sub-caliber projectile in a region between the nose and tail and having at least two segments, which extend along radial separating lines over the entire sabot length as in claim 5, wherein the improvement further comprises that the blank is made of a metallic material.

* * * * *